(12) United States Patent
Mandi et al.

(10) Patent No.: US 11,112,795 B1
(45) Date of Patent: Sep. 7, 2021

(54) MANEUVER-BASED INTERACTION SYSTEM FOR AN AUTONOMOUS VEHICLE

(71) Applicant: GM GLOBAL TECHNOLOGY OPERATIONS LLC, Detroit, MI (US)

(72) Inventors: Nathan Mandi, San Francisco, CA (US); Benjamin Earle Weinstein-Raun, Berkeley, CA (US); Gabriel Warshauer-Baker, Mountain View, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 396 days.

(21) Appl. No.: 16/056,662

(22) Filed: Aug. 7, 2018

(51) Int. Cl.
  *G05D 1/00* (2006.01)
  *G05D 1/02* (2020.01)
(52) U.S. Cl.
  CPC ......... *G05D 1/0088* (2013.01); *G05D 1/0221* (2013.01); *G05D 1/0231* (2013.01); *G05D 1/0257* (2013.01); *G05D 2201/0213* (2013.01)
(58) Field of Classification Search
  CPC .. G05D 1/0088; G05D 1/0221; G05D 1/0231; G05D 1/0257; G05D 2201/0213
  See application file for complete search history.

(56) References Cited

U.S. PATENT DOCUMENTS

| | | | |
|---|---|---|---|
| 5,610,815 A | 3/1997 | Gudat et al. | |
| 5,615,116 A | 3/1997 | Gudat et al. | |
| 5,956,250 A | 9/1999 | Gudat et al. | |
| 6,799,100 B2 | 9/2004 | Burns et al. | |
| 8,050,863 B2 | 11/2011 | Trepagnier et al. | |
| 8,126,642 B2 | 2/2012 | Trepagnier et al. | |
| 9,645,577 B1* | 5/2017 | Frazzoli | B60W 30/18163 |
| 10,209,718 B2* | 2/2019 | Tiwari | H04N 5/23296 |
| 2017/0168485 A1* | 6/2017 | Berntorp | G05D 1/0217 |
| 2019/0080266 A1* | 3/2019 | Zhu | G01C 21/3453 |
| 2019/0152490 A1* | 5/2019 | Lan | B60W 30/0956 |

OTHER PUBLICATIONS

Maneuver-Based Trajectory Planning for Highly Autonomous Vehicles on Real Road With Traffic and Driver Interaction (Year: 2010).*

* cited by examiner

*Primary Examiner* — Jeff A Burke
*Assistant Examiner* — Mohamad O El Sayah
(74) *Attorney, Agent, or Firm* — Medley, Behrens & Lewis, LLC

(57) ABSTRACT

An autonomous vehicle is described herein. The autonomous vehicle comprises sensor systems that generate sensor signals and a computing system. The computing system generates an awareness graph based upon the sensor signals. The awareness graph comprises nodes connected by directed edges. The nodes include a first node assigned to a first maneuver that is to be executed by a vehicle in a vicinity of the autonomous vehicle and a second node assigned to a second maneuver that is to be executed by the autonomous vehicle. The directed edges include a directed edge that extends from the second node to the first node indicating that execution of the second maneuver is dependent upon execution of the first maneuver. The autonomous vehicle determines an ordering of the first maneuver and the second maneuver based on the awareness graph and executes the second maneuver in accordance with the ordering.

20 Claims, 11 Drawing Sheets

MANEUVER-BASED INTERACTION SYSTEM FOR AN AUTONOMOUS VEHICLE

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others. The autonomous vehicle operates based upon sensor signals output by the sensor systems, wherein the sensor signals can be analyzed by the autonomous vehicle to identify objects (e.g., other vehicles) in regions surrounding the autonomous vehicle.

In addition to identifying objects (e.g., vehicles) in regions surrounding the autonomous vehicle, the autonomous vehicle also makes predictions as to future paths of the vehicles based in part upon the sensor signals. More specifically, the autonomous vehicle may predict a position of each vehicle at timestamps in the future. For instance, the autonomous vehicle may predict a position of a first vehicle in the vehicles at a first timestamp, a position of the first vehicle at a second timestamp, a position of a second vehicle in the vehicles at the first timestamp, a position of the second vehicle at the second timestamp, and so forth. The autonomous vehicle also makes predictions as to its own future path(s) as well.

When an intersection occurs between a future path of the autonomous vehicle and a predicted future path of a vehicle, the autonomous vehicle resolves the intersection using an interaction system. In an example, the interaction system may analyze the intersection and determine that the autonomous vehicle should yield to the vehicle and delay execution of a maneuver. In another example, the interaction system may analyze the intersection and determine that the autonomous vehicle should assert itself and execute the maneuver. The interaction system may also resolve intersections between vehicles other than the autonomous vehicle. For instance, the interaction system may resolve an intersection between a first vehicle and a second vehicle that are located in the surroundings of the autonomous vehicle.

There are several deficiencies associated with the conventional approach to resolving interactions between the autonomous vehicle and vehicles surrounding the autonomous vehicle. First, conventional interaction systems of autonomous vehicles typically provide a single future state of the autonomous vehicle and the surrounding vehicles. Thus, conventional interaction systems tend to assume that the autonomous vehicle will follow a particular path and do not take into account the effect of actions of the autonomous vehicle on the surrounding vehicles. Second, conventional interaction systems are ill-suited for dealing with aberrant behaviors of the surrounding vehicles. Third, conventional interaction systems tend to resolve every intersection that is to occur between the surrounding vehicles at each timestamp, some of which are not relevant to navigating the autonomous vehicle. This leads to an inefficient use of computing resources of the autonomous vehicle.

SUMMARY

The following is a brief summary of subject matter that is described in greater detail herein. This summary is not intended to be limiting as to the scope of the claims.

Disclosed herein are various technologies pertaining to operation of an autonomous vehicle. More specifically, described herein is a technique for generating an awareness graph based upon sensor signals generated by sensor systems of the autonomous vehicle. The autonomous vehicle may utilize portions of the awareness graph in order to determine an ordering of maneuvers that are to be executed by the autonomous vehicle and vehicles surrounding the autonomous vehicle. The autonomous vehicle then executes maneuvers in accordance with the ordering.

The autonomous vehicle comprises a plurality of sensor systems, an engine, and a computing system. The plurality of sensor systems includes a plurality of sensors that are configured to generate a plurality of sensor signals which are indicative of surroundings of the autonomous vehicle. For example, the plurality of sensor signals may be indicative of other vehicles in a vicinity of the autonomous vehicle. The computing system is in communication with the plurality of sensor systems and the engine.

In operation, the autonomous vehicle is operating on a road or a path. As the autonomous vehicle operates, the plurality of sensor systems generates a plurality of sensor signals, wherein the plurality of sensor signals is indicative of a first vehicle (as well as other vehicles) that is in a vicinity of the autonomous vehicle. The autonomous vehicle utilizes the plurality of sensor signals to determine first maneuver data for the first vehicle. The first maneuver data may include an identifier for a first maneuver that the first vehicle is to execute (e.g., a left turn), a predicted path of the first vehicle, a set of lanes that are to be traversed by the first vehicle during the first maneuver, and/or first regions of interest surrounding the first vehicle. The first regions of interest are regions that are to be monitored for operation of the first vehicle during the first maneuver. More specifically, the first regions of interest are regions surrounding the first vehicle that an operator of the first vehicle (e.g., a human driver) monitors (or will monitor) while the first vehicle executes the first maneuver. The first regions of interest may be determined based upon output of a computer-implemented machine learning model. The first maneuver data for the vehicle may also include a position of the first vehicle relative to the autonomous vehicle, a speed of the first vehicle, an acceleration of the first vehicle, and/or an orientation of the first vehicle. In an example, the plurality of sensor signals may indicate that the first vehicle is an oncoming vehicle (from the perspective of the autonomous vehicle) approaching an intersection and the autonomous vehicle may determine that the first vehicle is predicted to maintain a straight heading through the intersection. The autonomous vehicle may utilize the first maneuver data to generate predictions of future maneuvers that are to be executed by the first vehicle.

The autonomous vehicle may repeat this process for other vehicles that are indicated by the plurality of sensor signals. For instance, the plurality of sensor signals may also be indicative of a second vehicle that is to execute a second maneuver, and the autonomous vehicle may determine second maneuver data for the second vehicle. The second maneuver data comprises elements similar to that of the first maneuver data. In an example, the second vehicle may be approaching the intersection from a road that is perpendicular to a road from which the first vehicle is approaching. As with the first vehicle, the autonomous vehicle may utilize the second maneuver data to generate predictions of future maneuvers that are to be executed by the second vehicle.

The autonomous vehicle, by way of the computing system, then generates a computer-readable awareness graph using the first maneuver data for the first vehicle and the second maneuver data for the second vehicle. The awareness graph comprises nodes and directed edges. Each node in the nodes is assigned to a maneuver that is to be executed by a vehicle in a vicinity of the autonomous vehicle. For instance, a first node in the nodes may be assigned to the first maneuver executed by the first vehicle and a second node in the nodes may be assigned to the second maneuver executed by the second vehicle.

The directed edges indicate dependency of maneuvers. For instance, a first directed edge may extend from the first node to the second node indicating that execution of the first maneuver by the first vehicle is dependent upon execution of the second maneuver by the second vehicle. Stated another way, the first directed edge indicates that when the first maneuver and the second maneuver are undertaken (or are about to be undertaken), an operator of the first vehicle monitors (or should monitor) the second vehicle undertaking the second maneuver. The autonomous vehicle may add the first directed edge to the awareness graph based upon regions of interest in the first maneuver data and/or the second maneuver data. The autonomous vehicle may also add nodes and directed edges corresponding to additional predicted future maneuvers of the first vehicle and/or the second vehicle.

The autonomous vehicle then determines a third maneuver that is to be executed by the autonomous vehicle. In an example, the autonomous vehicle may be heading towards the intersection in a direction opposite of the first vehicle and perpendicular to the second vehicle. The third maneuver may be executing a left turn at the intersection which the first vehicle and the second vehicle are approaching. The autonomous vehicle may then utilize a process related to that described above to determine third maneuver data for the third maneuver (including third regions of interest).

Concurrently with or subsequent to generating the awareness graph, the autonomous vehicle may cause a third node to be added to the awareness graph. The third node is assigned to the third maneuver that is to be executed by the autonomous vehicle. In an example, the third maneuver may be executing a left turn, and positions of the first vehicle and the second vehicle (as indicated by the first maneuver data and the second maneuver data) may fall within the third regions of interest for the third maneuver. Based on the third regions of interest in the third maneuver data, the autonomous vehicle may cause a second directed edge and a third directed edge to be added to the awareness graph. The second directed edge extends from the third node to the first node and the third directed edge extends from the third node to the second node, thereby indicating that execution of the third maneuver is dependent upon execution of the first maneuver by the first vehicle and execution of the second maneuver by the second vehicle.

In an embodiment, the autonomous vehicle may cause different nodes corresponding to different potential maneuvers to be added to the awareness graph. For instance, instead of the third node, the autonomous vehicle may add a fourth node to the awareness graph (and directed edges entering or exiting the fourth node), wherein the fourth node is assigned to a fourth maneuver that can be considered an alternative to the third maneuver, thereby generating a second awareness graph. The autonomous vehicle may then calculate a first score for the awareness graph and a second score for the second awareness graph. The scores may be based upon metadata for maneuvers (e.g., maneuver data) in the awareness graph and the second awareness graph, respectively. In an example, the first score may be higher than the second score, and as such the autonomous vehicle may proceed using the awareness graph.

The autonomous vehicle may then generate a subgraph of the awareness graph by selecting a subset of nodes in the nodes and a subset of directed edges in the directed edges. The subset of nodes and the subset of directed edges are those that are relevant for the current maneuver that is about to be executed by the autonomous vehicle (i.e., the third maneuver). For instance, the subset of nodes may include the first node, the second node, the third node. The subset of directed edges may include the first directed edge, the second directed edge, and the third directed edge.

The autonomous vehicle may then determine an ordering in which the maneuvers are to occur based upon the subgraph. In a specific example, the autonomous vehicle may determine a first candidate ordering and a second candidate ordering based upon the subgraph. The autonomous vehicle may then calculate a first score for the first candidate ordering and a second score for the second candidate ordering based in part upon metadata (e.g., maneuver data) for maneuvers in the subgraph. The autonomous vehicle may select the candidate ordering having the greater score to use as the ordering.

The autonomous vehicle may then control the engine in order to execute the third maneuver in accordance with the ordering. In an example, the ordering may indicate that the autonomous vehicle is to execute the third maneuver prior to the first vehicle executing the first maneuver and the second vehicle executing the second maneuver, and as such the autonomous vehicle may assert itself and execute the third maneuver. In another example, the ordering may indicate that the autonomous vehicle is to execute the third maneuver subsequent to the first vehicle and the second vehicle executing their respective maneuvers, and as such the autonomous vehicle may yield to the first vehicle and the second vehicle.

Subsequently, the autonomous vehicle may repeat the process described above for other nodes and directed edges in the awareness graph to determine ordering of subsequent maneuvers executed by the autonomous vehicle, the first vehicle, and the second vehicle. When the nodes in the awareness graph have been exhausted (i.e., all the maneuvers have been executed), the autonomous vehicle may generate a new awareness graph based on new sensor signals generated by the plurality of sensor systems.

The above-described technologies present various advantages over conventional interaction systems. First, unlike conventional interaction systems, the above-described technologies do not need to consider every potential intersection in the future, and thus are more computationally efficient as the subgraph of the awareness graph is used to determine the ordering. Second, the above-described technologies are time-independent, whereas conventional interaction systems are time-dependent. Third, the above-described technologies enable the autonomous vehicle to determine predicted paths of vehicles surrounding the autonomous vehicle based upon actions undertaken by the autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
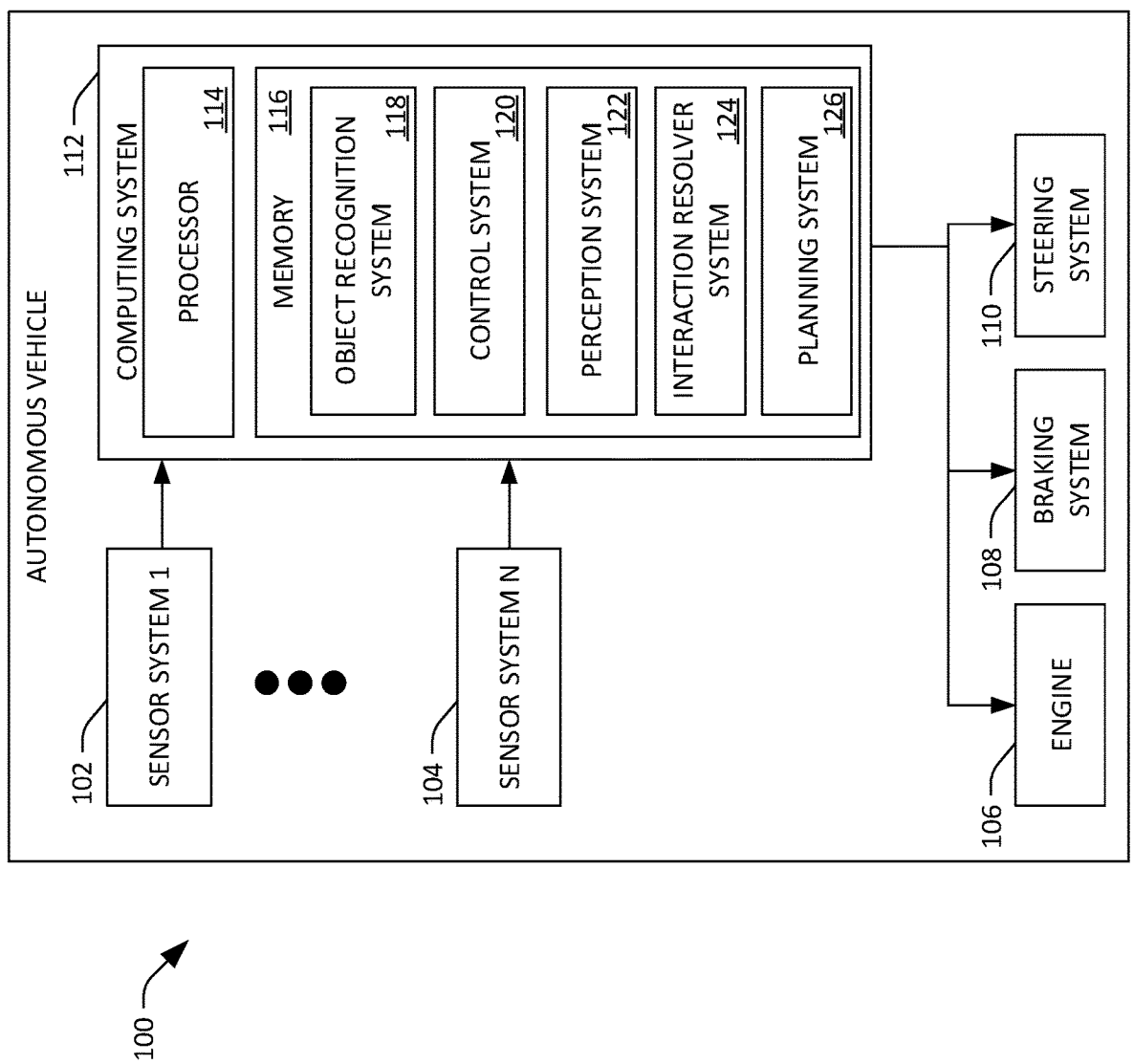
FIG. 1 illustrates an exemplary autonomous vehicle.

Various technologies pertaining to navigation by an autonomous vehicle using an awareness graph are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 102-104 (a first sensor system 102 through an nth sensor system 104). The sensor systems 102-104 are of different types and are arranged about the autonomous vehicle 100. For example, the first sensor system 102 may be a lidar sensor system and the nth sensor system 104 may be a camera (image) system. Other exemplary sensor systems include radar sensor systems, GPS sensor systems, sonar sensor systems, infrared sensor systems, and the like.

Each sensor system in the plurality of sensor systems 102-104 may comprise multiple sensors. For example, the first sensor system 102 may comprise a first sensor, a second sensor, etc. Furthermore, some or all of the plurality of sensor systems 102-104 may comprise articulating sensors. An articulating sensor is a sensor that may be oriented (i.e., rotated) by the autonomous vehicle 100 such that a field of view of the articulating sensor may be directed towards different regions surrounding the autonomous vehicle 100.

The autonomous vehicle 100 further includes several mechanical systems that are used to effectuate appropriate motion of the autonomous vehicle 100. For instance, the mechanical systems can include but are not limited to, an engine 106, a braking system 108, and a steering system 110. The engine 106 may be an electric engine or a combustion engine. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104 and is further in communication with the engine 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory comprises an object recognition system 118, a control system 120, a perception system 122, an interaction resolver system 124, and a planning system 126. The object recognition system 118 is configured to assign labels to objects (in proximity to the autonomous vehicle 100) captured in sensor signals output by the sensor systems 102-104. These predefined types of objects can include, but are not limited to, pedestrian, bike, car, truck, bus, and static (unknown), where the type "static" can represent telephone poles, construction equipment, etc.). In a specific example, the sensor systems 102-104 may include a radar sensor system.

The control system 120 is configured to receive output of the object recognition system 118, the perception system 122, the interaction resolver system 124, and/or the planning system 126, and is further configured to control at least one of the mechanical systems (the engine 106, the brake system 108, and/or the steering system 110) based upon output of the object recognition system 118, the perception system 122, the interaction resolver system 124, and/or the planning system 126.

Figure 2:
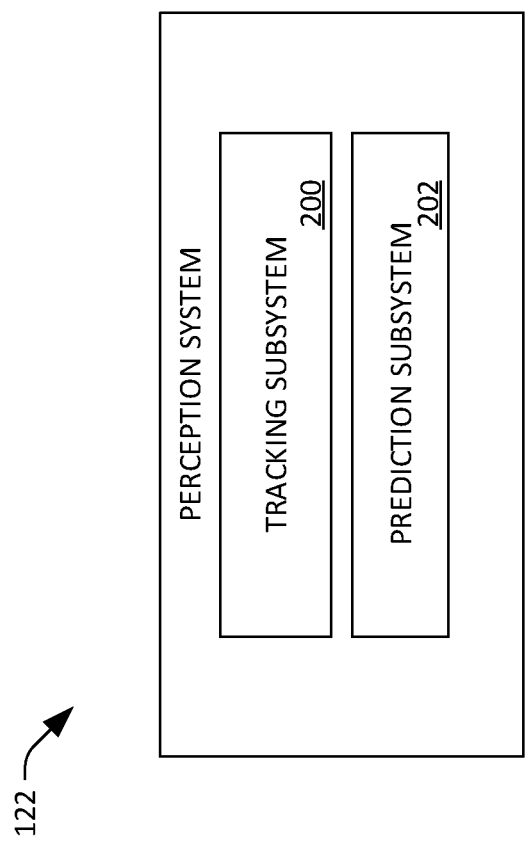
FIG. 2 is a functional block diagram of a perception system of an autonomous vehicle.

Generally speaking, the perception system 122 is configured to track objects (e.g., vehicles) surrounding the autonomous vehicle 100 and predict future paths of the objects. Turning briefly to FIG. 2, subsystems of the perception system 122 are illustrated. The perception system 122 may include a tracking subsystem 200 and a prediction subsystem 202. The tracking subsystem 200 is configured to track objects surrounding the autonomous vehicle 100. As such, the tracking subsystem 200 may be configured to interact with the plurality of sensor systems 102-104 to effectuate the tracking. In an example, when the plurality of sensor systems 102-104 include articulating (i.e., orientable) sensors, the tracking subsystem 200 may be configured to cause the articulating sensors to remain directed at objects moving around the surroundings of the autonomous vehicle 100 as the autonomous vehicle 100 is moving. In another example, the tracking subsystem 200 may be configured to control sensor systems in the plurality of sensor systems 102-104 such that objects remain tracked.

The prediction subsystem 202 is configured to predict future paths (i.e., a series of maneuvers) of objects (e.g., vehicles) based on sensor signals generated by the plurality of sensor systems 102-104. The prediction subsystem 202 may utilize computer-implemented machine learning models, such as a deep neural network (DNN), in order to predict the future paths. In an example, the prediction subsystem 202 may predict future paths of the objects for a period of time ranging from 10-12 seconds.

Turning back to FIG. 1, the memory 116 may include an interaction resolver system 124. As will be described in greater detail below, the interaction resolver system 124 is configured to generate awareness graphs based upon sensor signals generated by the plurality of sensor systems and/or data received from the object recognition system 118 and/or the perception system 122. The interaction resolver system 124 is also generally configured to resolve (predicted) interactions between the autonomous vehicle 100 and other objects (e.g., vehicles) surrounding the autonomous vehicle 100. For instance, if the autonomous vehicle 100 is configured to execute a maneuver near a vehicle executing another maneuver, the interaction resolver system 124 may determine whether the autonomous vehicle 100 should execute the maneuver or yield until the other vehicle executes its maneuver. While not shown in FIG. 1, the memory 116 may also include awareness graphs and subgraphs of the awareness graphs (described below).

In an embodiment, the interaction resolver system 124 may be a component of the prediction subsystem 202 of the perception system 122.

The memory 116 may further include a planning system 126. In general, the planning system 126 may be configured to communicate with the object recognition system 118, the perception system 122, and the interaction resolver system 124 in order to plan a route that the autonomous vehicle 100 is to follow. For instance, the planning system 126 may plan a series of maneuvers that are to be performed by the autonomous vehicle 100.

Figure 3:
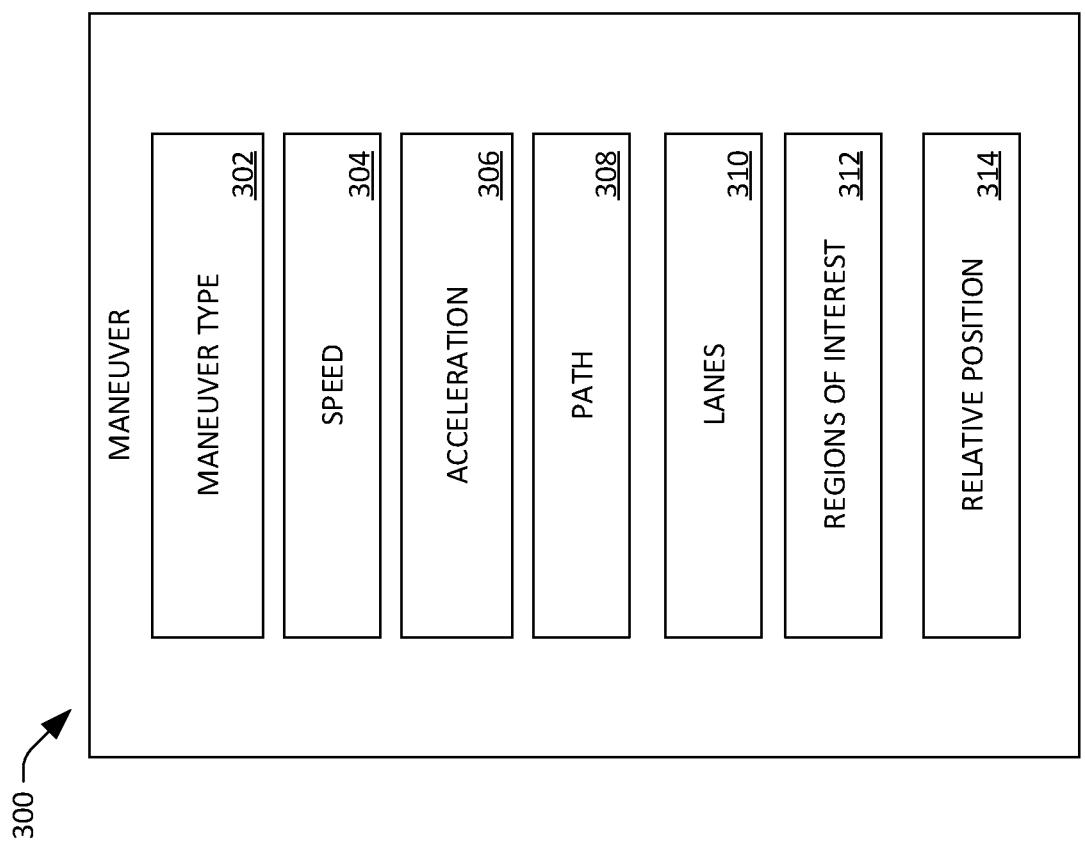
FIG. 3 is a functional block diagram of maneuver data.

With reference now to FIG. 3, exemplary maneuver data 300 for a maneuver executed by a vehicle is depicted. The maneuver data 300 may be considered metadata for a maneuver. The maneuver data 300 may be assigned to maneuvers executed by the autonomous vehicle 100, as well as maneuvers executed by vehicles in proximity to the autonomous vehicle 100. The maneuver data 300 may be an object in an object-oriented programming language and may be stored in the memory 116 of the autonomous vehicle 100. As will be described in greater detail below, the perception system 122 of the autonomous vehicle 100 may determine the maneuver data 300 based upon sensor signals outputted by the plurality of sensor signals 102-104.

The maneuver data 300 may include an identifier for a maneuver type 302. In a non-limiting example, the maneuver type 302 may be maintaining a heading (i.e., going straight), a left turn, a right turn, a U-turn, changing lanes, merging, parking, parallel parking, navigating a traffic circle, backing-up and/or braking. The maneuver data 300 may include a speed 304 of the vehicle during execution of the maneuver, an acceleration 306 of the vehicle during execution of the maneuver, and a path 308 of the vehicle during execution of the maneuver. The maneuver data 300 may include a set of lanes 310 that are to be traversed by the vehicle during execution of the maneuver.

Moreover, the maneuver data 300 may include regions of interest 312. The regions of interest 312 are regions surrounding the vehicle executing the maneuver that are to be monitored for operation of the first vehicle during the first maneuver. When the vehicle executing the maneuver is the autonomous vehicle 100, the regions of interest are regions surrounding the autonomous vehicle 100 that are to be monitored by sensors in the plurality of sensor systems 102-104 as the autonomous vehicle 100 executes the maneuver. When the vehicle executing the maneuver is a conventional vehicle operated by a human driver, the regions of interest 312 are regions surrounding the conventional vehicle that a human driver would monitor when he or she causes the conventional vehicle to execute the maneuver. The regions of interest 312 may be determined based on output of a computer-implemented machine learning model. The maneuver data 300 may also include a position 314 of the vehicle as the vehicle executes the maneuver relative to the autonomous vehicle 100.

Additionally, while not depicted in FIG. 3, some maneuvers may comprise more than one sub-maneuvers. For example, a left turn may include a sub-maneuver for beginning the left turn (i.e., signaling for a left turn and creeping into an intersection in which the left turn is to occur), a sub-maneuver for a middle of a left turn (i.e., as the autonomous vehicle 100 begins to angle itself to make the left turn), and a sub-maneuver for an end of a left turn (i.e., as the autonomous vehicle 100 is oriented perpendicular to its intended heading). In the case of maneuvers involving sub-maneuvers, the autonomous vehicle 100 may maintain a single instance of maneuver data for the entire maneuver, or the autonomous vehicle 100 may maintain a collection of maneuver data, each maneuver data in the collection assigned to a different sub-maneuver of the maneuver.

Figure 4:
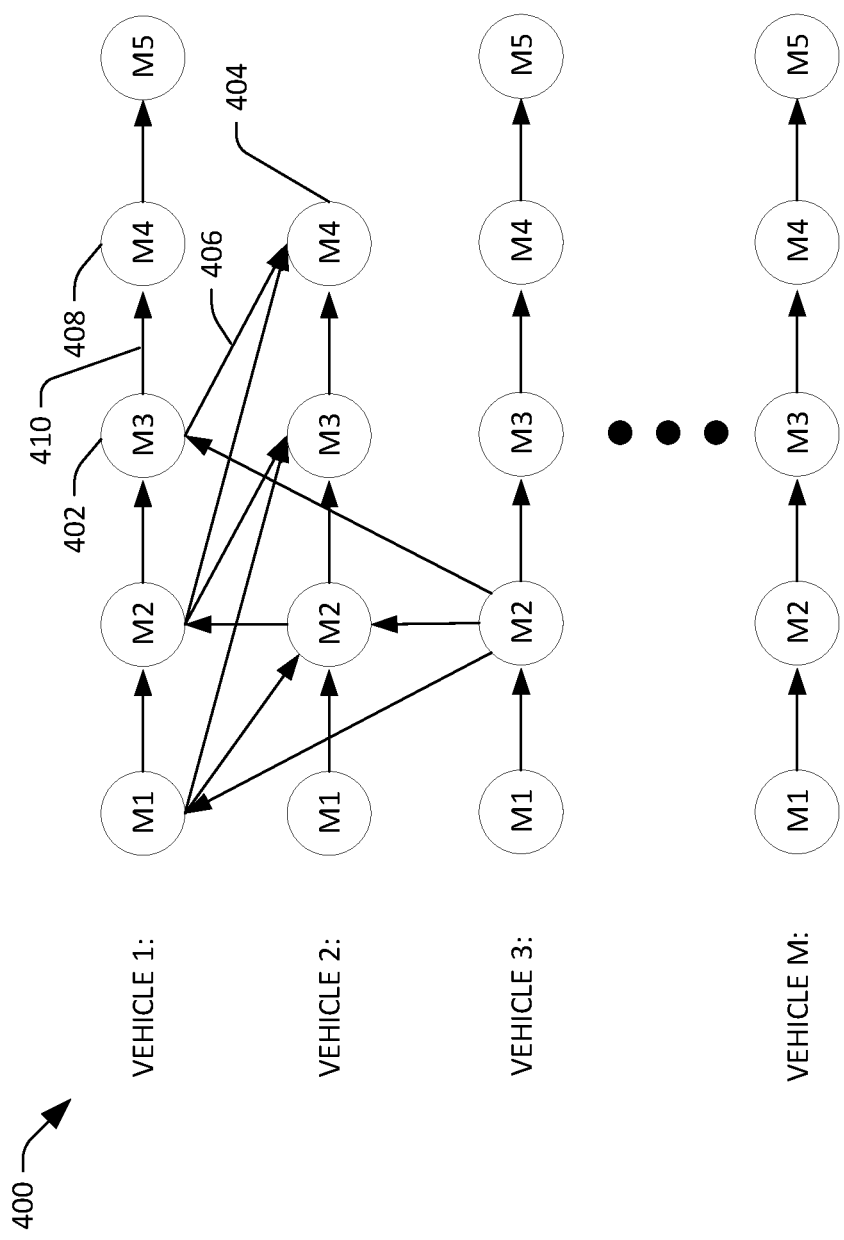
FIG. 4 is a depiction of an awareness graph generated by an autonomous vehicle.

Turning now to FIG. 4, an exemplary computer-readable awareness graph 400 that may be generated by the computing system 112 of the autonomous vehicle 100 is depicted. As described above, the awareness graph 400 comprises nodes connected by directed edges. Each node in the nodes is assigned to a maneuver that is executed by a vehicle in the vehicles 1-M. In an example, node 402 is assigned to a third maneuver that is to be executed by vehicle 1 and node 404 is assigned to a fourth maneuver that is to be executed by vehicle 2. A directed edge 406 extends from node 402 to node 404 (i.e. is pointed towards), thereby indicating that when the third maneuver (executed by vehicle 1) and the fourth maneuver (executed by vehicle 2) are executed, execution of the third maneuver is dependent on execution of the fourth maneuver. In another example, node 408 is assigned to fourth maneuver executed by the first vehicle. A directed edge 410 extends from node 402 to node 408, thereby indicating that execution of the third maneuver by the first vehicle is dependent upon execution of the fourth maneuver by the first vehicle.

In general, the time cost to create the awareness graph 400 is O(MN), where M is the number of vehicles and N is the average number of maneuvers per vehicle. It is contemplated that the subgraph will operate on a small subset of nodes, for instance, M nodes, thus enabling computationally efficient generation of orderings (described above).

Figure 5:
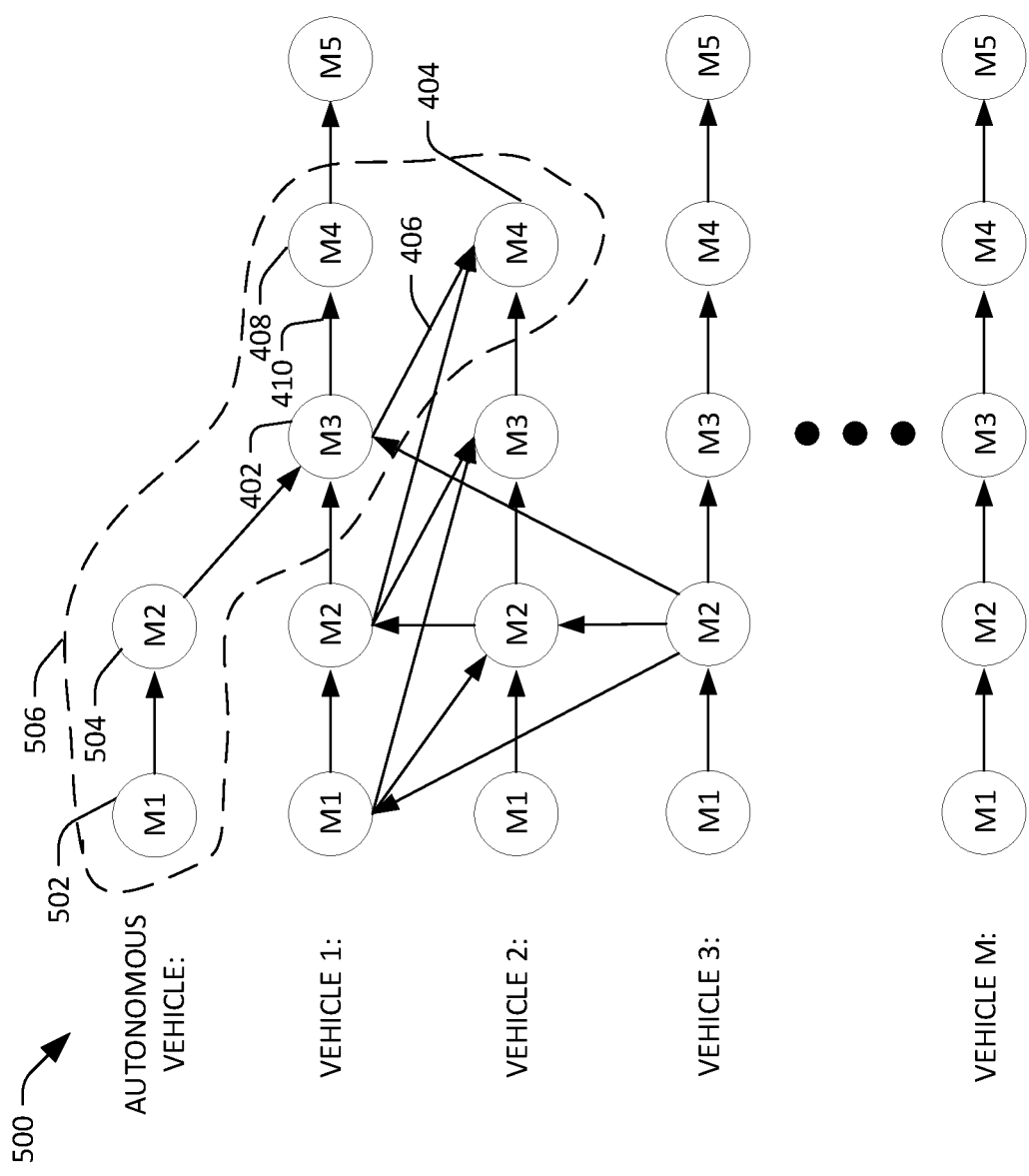
FIG. 5 is a depiction of an awareness graph generated by an autonomous vehicle that includes nodes assigned to maneuvers of the autonomous vehicle.

Referring now to FIG. 5, an exemplary awareness graph 500 including nodes assigned to maneuvers executed by the autonomous vehicle 100 is depicted. In addition to the nodes and the directed edges in the awareness graph 400 described above, the awareness graph 500 includes a node 502 assigned to a first maneuver executed by the autonomous vehicle 100 and a node 504 assigned to a second maneuver executed by the autonomous vehicle 100. A subgraph 506 of the awareness graph 500 is also illustrated in FIG. 5. The subgraph 506 includes nodes 402, 404, 408, 502, and 504, as well as the directed edges connecting these nodes. As described above, the autonomous vehicle 100 utilizes the subgraph 506 in determining an ordering of the maneuvers in the subgraph 506.

Figure 6:
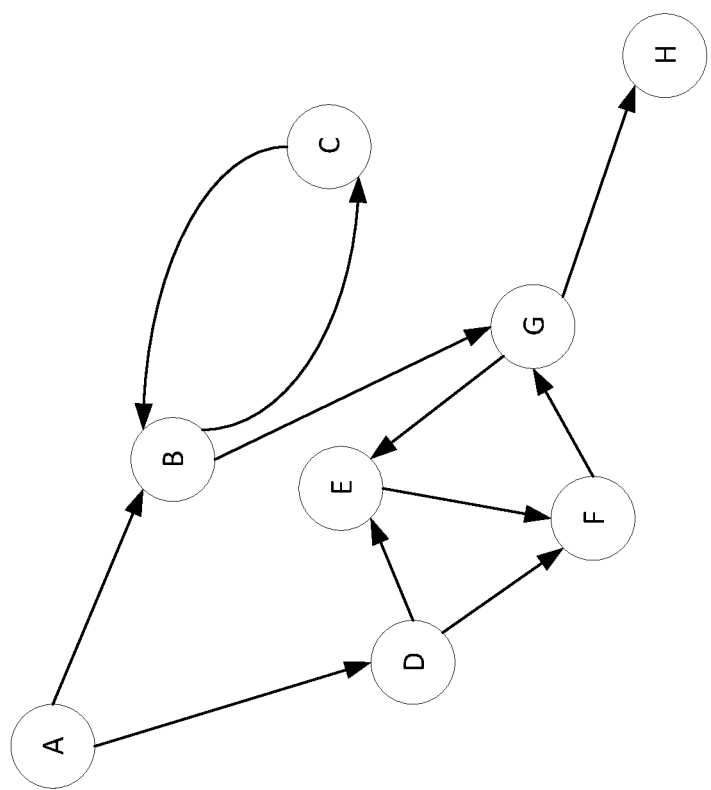
FIG. 6 is a depiction of a subgraph of an awareness graph.

With reference to FIG. 6, an exemplary subgraph 600 of an awareness graph is depicted. Each node (A-H) in the subgraph 600 is assigned to a different maneuver executed by a different vehicle. For instance, a node in the nodes of the subgraph 600 may be assigned to a maneuver executed by the autonomous vehicle 100. It is contemplated that subgraphs typically will be directed acyclic graphs with a relatively small amount of strongly connected components, however, some subgraphs may include cycles that may impede generating the ordering in which maneuvers are to occur. For instance, the subgraph 600 includes a cycle between nodes B and C and another cycle between nodes E, F, and G. The cycle between nodes B and C indicates that an operator of the vehicle executing maneuver B is aware of the vehicle executing maneuver C, and the operator of the vehicle executing maneuver C is aware of the vehicle executing maneuver B. The autonomous vehicle 100 may resolve cycles within the subgraph 600 by condensing nodes and directed edges that comprise the cycle into a condensed node (described below in FIG. 7).

Figure 7:
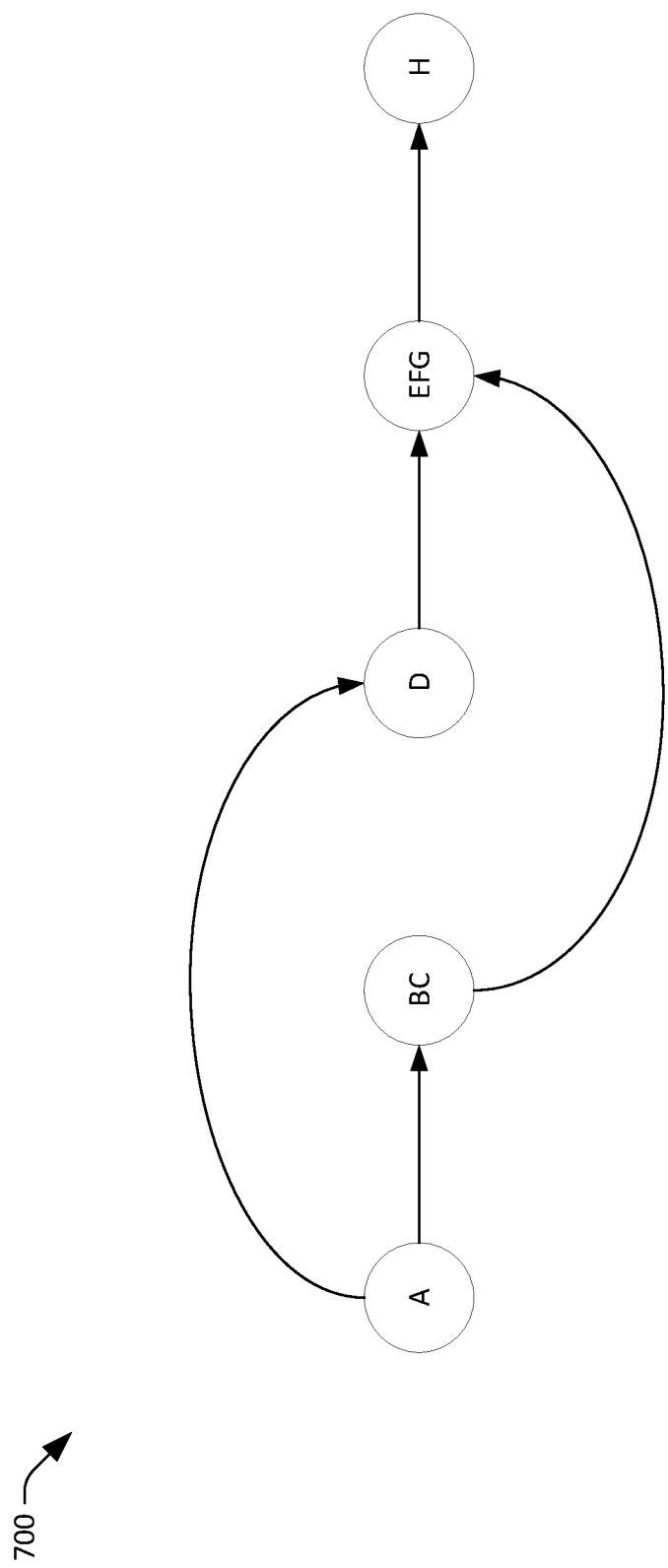
FIG. 7 is a depiction of a resolved subgraph of an awareness graph.

Referring now to FIG. 7, a resolved subgraph 700 of the subgraph 600 is depicted. The resolved subgraph 700 has been topologically sorted. Moreover, the autonomous vehicle 100 has resolved cycles within the subgraph 600 by condensing cycles to a single node. For instance, the cycle between nodes B and C has been condensed to a condensed node BC. The cycle between nodes E, F, and G has been condensed to a condensed node EFG. The autonomous vehicle 100 may utilize the resolved subgraph as an ordering in which maneuvers (or set(s) of maneuvers) assigned to nodes A, BC, D, EFG, and H occur. In an example, if maneuver H is executed by the autonomous vehicle 100, the autonomous vehicle 100 may assert itself and execute maneuver H prior to other vehicles executing maneuvers A, BC, D, and EFG. In another example, if maneuver A is executed by the autonomous vehicle 100, the autonomous vehicle 100 may yield to the other vehicles and execute maneuver A subsequent to the other vehicles executing maneuvers A, BC, D, and EFG. The autonomous vehicle 100 may employ a tie-breaking rule in order to determine the ordering of maneuvers in a condensed node.

With reference generally now to FIGS. 1-7, operation of the autonomous vehicle 100 is now set forth. It is contemplated that the autonomous vehicle 100 is operating on a road or a path. As the autonomous vehicle 100 operates, the plurality of sensor systems 102-104 generate a plurality of sensor signals. The plurality of sensor signals may be indicative of an object in a vicinity of the autonomous vehicle 100. The object recognition system 118 may receive the plurality of sensor signals and determine an identity of the object. In an example, the object recognition system 118 may determine that the object is a first vehicle based upon the plurality of sensor signals. The object recognition system 118 may also determine identities of other objects (e.g., other vehicles) in the vicinity of the autonomous vehicle 100 based upon the plurality of sensor signals.

The autonomous vehicle 100 also causes sensors in the plurality of sensor systems 102-104 to track the first vehicle as the first vehicle and/or the autonomous vehicle 100 move about the environment by way of the tracking subsystem 200 of the perception system 122. Additionally, the autonomous vehicle 100 predicts a first maneuver (e.g. maintaining a straight heading at an intersection) that is to be executed by the first vehicle by way of the prediction subsystem 202 of the perception system 122. More specifically, the prediction subsystem 202 may determine maneuver data for the first vehicle based upon the plurality of sensor signals and may utilize the maneuver data to predict the first maneuver and future maneuvers that are to be executed by the first vehicle. The prediction subsystem 202 may predict future maneuvers of the first vehicle that may occur within the next 10-12 seconds in the future. For instance, the prediction subsystem 202 may predict that the first vehicle is to perform a first maneuver at a first timestamp in the future, a second maneuver at a second timestamp in the future, etc.

The autonomous vehicle 100 may repeat this process for other vehicles that are indicated by the plurality of sensor signals. For instance, the plurality of sensor signals may be indicative of a second vehicle that is to execute a second maneuver, and the autonomous vehicle 100 may determine second maneuver data for the second maneuver. In an example, the second vehicle may be approaching the intersection from a road that is perpendicular to a road from which the first vehicle is approaching.

Subsequent to determining the first maneuver data and the second maneuver data, the interaction resolver system 124 of the autonomous vehicle 100 then generates a computer-readable awareness graph based upon the plurality of sensor signals (i.e., the first maneuver data and the second maneuver data). The awareness graph may be considered a projected future of maneuvers executed by vehicles surrounding the autonomous vehicle 100. The awareness graph comprises nodes and directed edges. Each node in the nodes is assigned to a maneuver that is to be executed by a vehicle. For instance, the nodes may include a first node assigned to the first maneuver executed by the first vehicle and a second node assigned to the second maneuver executed by the second vehicle.

The directed edges are indicative of dependency of maneuvers. As described previously, the first maneuver data for the first vehicle includes an identifier for a maneuver type and first regions of interest surrounding the first vehicle. In an example, the interaction resolver system 124 determines that the second vehicle is located in the first regions of interest surrounding the first vehicle based upon the first maneuver data for the first vehicle and the second maneuver data for the second vehicle. As such, the interaction resolver system 124 causes a first directed edge to be added to the awareness graph. The first directed edge extends from the first node to the second node (i.e. points towards the second node), indicating that execution of the first maneuver by the first vehicle is dependent upon execution of the second maneuver by the second vehicle. More specifically, if the first vehicle is a conventional motor vehicle operated by a driver, the directed edge indicates that when the first maneuver is undertaken by the first vehicle, an operator of the first vehicle is (or should be) aware of the second maneuver undertaken by the second vehicle and hence monitors (or should monitor) the second vehicle. If the first vehicle is another autonomous vehicle, the directed edge indicates that when the first maneuver is undertaken by the first vehicle, the first vehicle is aware the second maneuver (e.g., through use of sensor systems) undertaken by the second vehicle and hence monitors the second vehicle using sensor systems.

Concurrently with or subsequent to generating the awareness graph, the autonomous vehicle 100 may determine, by way of the planning system 126, that a third maneuver is to be executed by the autonomous vehicle 100. The planning system 126 may determine third maneuver data for the third maneuver, wherein the third maneuver data includes third regions of interest for the third maneuver. The planning system 126 may also communicate with the perception system 122 in order to determine the third maneuver data (including third regions of interest). In an example, the third maneuver may be making a left turn at the intersection that the first vehicle and the second vehicle are approaching. As such, the interaction resolver system 124 may cause a third node assigned to the third maneuver to be added to the awareness graph. Based on the third regions of interest in the third maneuver data, and the relative positions of the first vehicle and the second vehicle specified in the first maneuver data and the second maneuver data, the autonomous vehicle 100 may cause a second directed edge and a third directed edge to be added to the awareness graph. The second directed edge extends from the third node to the first node. The third directed edge extends from the third node to the second node, thereby indicating that execution of the third maneuver is dependent upon execution of the first maneuver by the first vehicle, as well as execution of the second maneuver by the second vehicle.

In an embodiment, the interaction resolver system 124 of the autonomous vehicle 100 may cause different nodes corresponding to different potential maneuvers to be added to the awareness graph. For instance, instead of the third node, the autonomous vehicle 100 may add a fourth node to the awareness graph (and directed edges entering or exiting the fourth node), thereby generating a second awareness graph. The fourth node is assigned to a fourth maneuver that can be considered an alternative to the third maneuver. The autonomous vehicle 100, by way of the interaction resolver system 124, may then determine a first score for the awareness graph based upon metadata for maneuvers in the awareness graph. The first score is reflective of a first state of the vicinity surrounding the autonomous vehicle 100 when the autonomous vehicle 100 executes the third maneuver. The autonomous vehicle 100 may also determine a second score for the second awareness graph based upon metadata for maneuvers in the second awareness graph. The interaction resolver system 124 may then choose to proceed with the awareness graph or the second awareness graph depending upon which has the greater score.

The autonomous vehicle 100, by way of the interaction resolver system 124, may then generate a subgraph of the awareness graph by selecting a subset of nodes in the nodes and a subset of directed edges in the directed edges. The subset of nodes and the subset of directed edges are those that relevant for the current maneuver that is about to be executed by the autonomous vehicle 100 (i.e., the third maneuver). For instance, the subset of nodes and the subset of directed edges may include the first node, the second node, and the third node, as well as the first directed edge, the second directed edge, and the third directed edge.

In the event that the subgraph includes cycles, the interaction resolver system 124 may resolve the cycles. For instance, the interaction resolver system 124 may condense nodes and directed edges included in a cycle into a single condensed node in the subgraph of the awareness graph.

The interaction resolver system 124 may then determine an ordering in which the first maneuver, the second maneuver, and third maneuver are to occur based upon the subgraph. In an example, the interaction resolver system 124 may determine a first candidate ordering of maneuvers and a second candidate ordering of maneuvers based upon the subgraph. The interaction resolver system 124 can then calculate a first score for the first candidate ordering and a second score for the second candidate ordering based in part upon metadata for maneuvers in the subgraph. When the first score is greater than or equal to the second score, the interaction resolver system 124 can use the first candidate ordering as the ordering. When the first score is less than the second score, the interaction resolver system 124 can use the second candidate ordering as the ordering.

The autonomous vehicle 100 may then control (by way of the control system 120) the engine 106, the braking system 108, and/or the steering system 110 in order to execute the third maneuver in accordance with the ordering. In an example, the ordering may indicate that the autonomous vehicle 100 is to execute the third maneuver prior to the first vehicle executing the first maneuver and the second vehicle executing the second maneuver. As such, the autonomous vehicle 100 executes the third maneuver prior to the first maneuver and the second maneuver. In another example, the ordering may indicate that the autonomous vehicle 100 is to execute the third maneuver subsequent to the first vehicle executing the first maneuver, but prior to the second vehicle executing the second maneuver. As such, the autonomous vehicle 100 yields to the first vehicle until the first vehicle completes execution of the first maneuver, then asserts itself and executes the third maneuver. In yet another example, the ordering may indicate that the autonomous vehicle 100 is to execute the third maneuver subsequent to the first vehicle executing the first maneuver and the second vehicle executing the second maneuver. The autonomous vehicle 100 then yields to both the first vehicle and the second vehicle. After the first vehicle and second vehicle have completed their respective maneuvers, the autonomous vehicle 100 executes the third maneuver.

The autonomous vehicle 100 may execute the third maneuver and/or yield to a maneuver performed by the first vehicle and/or the second vehicle by controlling at least one the engine 106, the braking system 108, and the steering system 110.

Subsequent to executing the third maneuver in accordance with the ordering (and allowing for other maneuvers in the ordering to be executed), the autonomous vehicle 100 may repeat the process described above for other nodes and directed edges in the awareness graph to determine ordering of subsequent maneuvers executed by the autonomous vehicle 100, the first vehicle, and the second vehicle. More specifically, the autonomous vehicle 100 may generate a second subgraph, wherein the second subgraph includes different nodes and directed edges than the (previously referenced) subgraph, and may determine a second ordering based upon the second subgraph. When the nodes in the awareness graph have been exhausted (i.e., all the maneuvers have been executed), the autonomous vehicle 100 may generate a new awareness graph at a fixed time interval based on new sensor signals generated by the plurality of sensor systems, and may repeat the above-described process for further navigation of the autonomous vehicle 100.

While the process described above has been characterized as involving the autonomous vehicle 100, a first vehicle, and a second vehicle, it is to be understood that the process described may involve many different vehicles executing many different maneuvers. For instance, the process described above may generate an awareness graph with nodes and directed edges corresponding to 2 to 40 vehicles in a vicinity of the autonomous vehicle 100.

In an embodiment, each directed edge in the directed edge may be weighted, wherein a weight of a directed edge is indicative of a proximity of vehicles corresponding to the nodes connected by the (weighted) directed edge. The autonomous vehicle 100 may further determine the ordering in which maneuvers are to occur based upon the weight of the directed edge.

In an embodiment, the interaction resolver system 124 may compute orderings of maneuvers that are independent of the autonomous vehicle 100 prior to determining the ordering.

Figure 8:
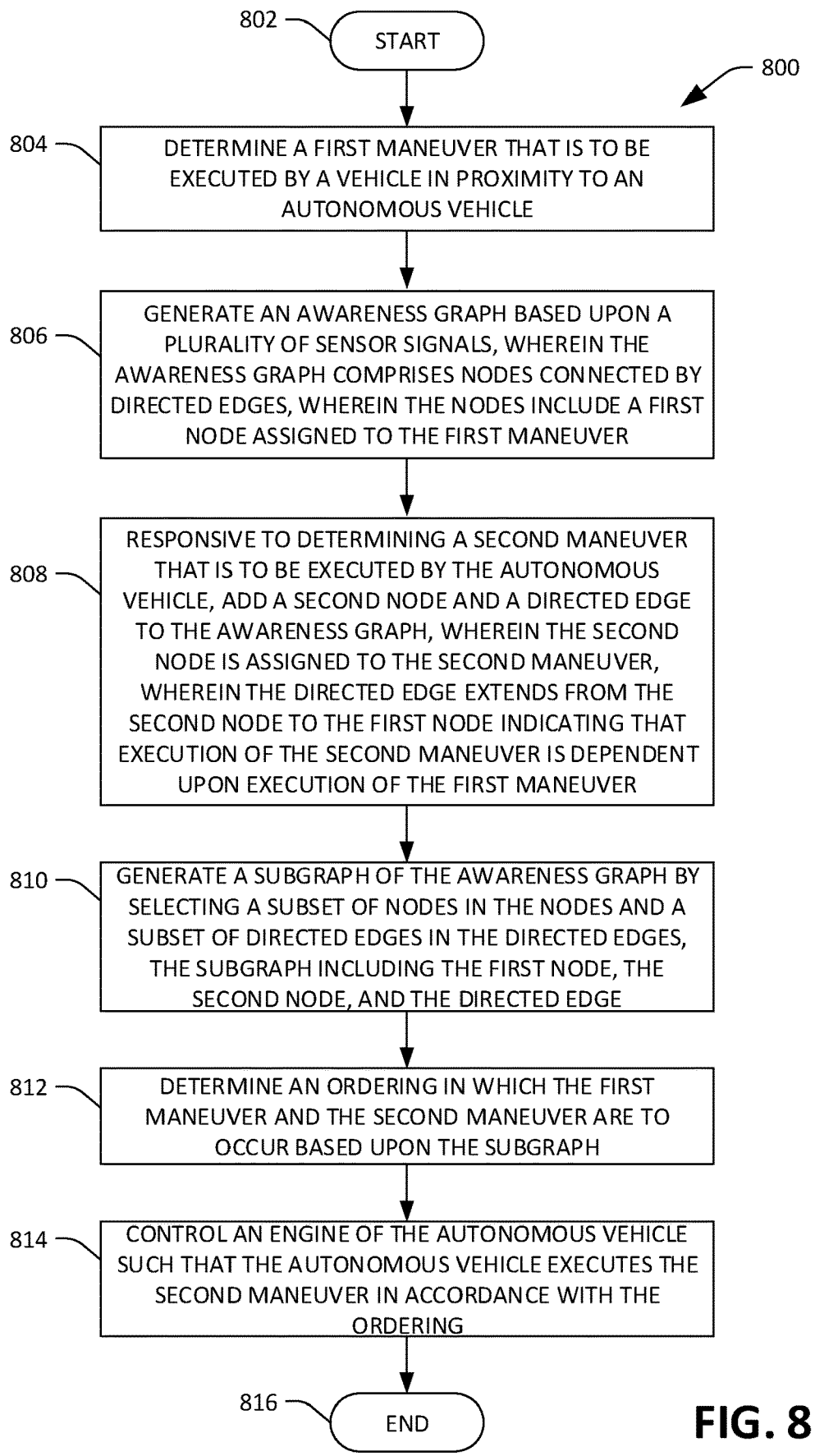
FIG. 8 is a flow diagram illustrating an exemplary methodology for navigating an autonomous vehicle based upon an awareness graph.
Figure 9:
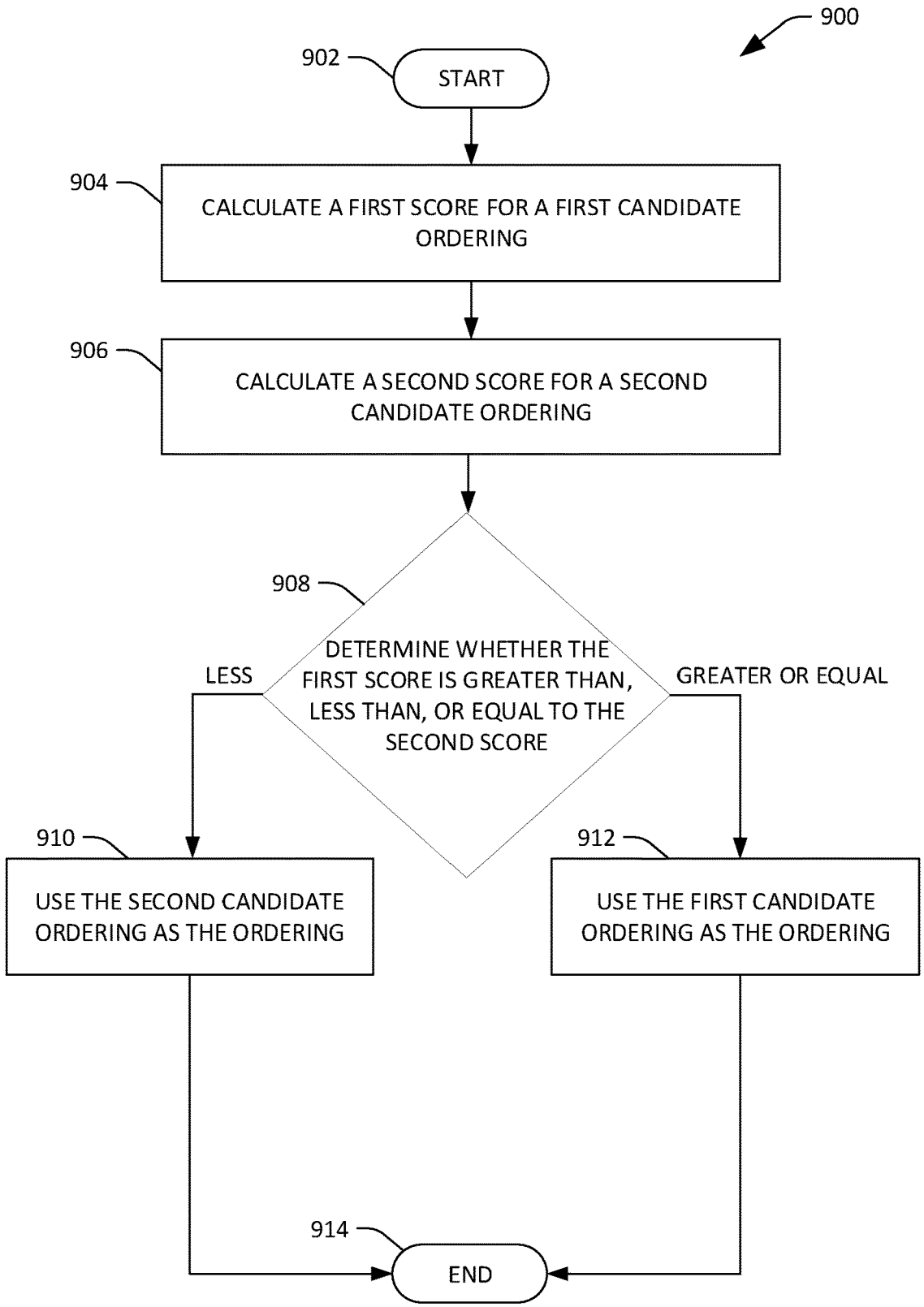
FIG. 9 is a flow diagram illustrating an exemplary methodology for determining an ordering in which an autonomous vehicle is to execute a maneuver relative to maneuvers executed by other vehicles.

FIGS. 8 and 9 illustrate exemplary methodologies relating to navigating an autonomous vehicle using an awareness graph. While the methodologies are shown and described as being a series of acts that are executed in a sequence, it is to be understood and appreciated that the methodologies are not limited by the ordering of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 8, an exemplary methodology 800 for navigating an autonomous vehicle based upon an awareness graph is illustrated. The methodology 800 begins at 802, and at 804, the autonomous vehicle determines a first maneuver that is to be executed by a vehicle in the vicinity of the autonomous vehicle based upon a plurality of sensor signals output by a plurality of sensor systems of the autonomous vehicle. At 806, the autonomous vehicle generates an awareness graph based upon the plurality of sensor signals. The awareness graph comprises nodes connected by directed edges. Each node in the nodes is assigned to a different maneuver that is to be executed by one or more vehicles in the vicinity of the autonomous vehicle. The nodes include a first node assigned to the first maneuver that is to be executed by the vehicle.

At 808, responsive to determining a second maneuver that is to be executed by the autonomous vehicle, the autonomous vehicle adds a second node and a directed edge to the awareness graph. The second node is assigned to the second maneuver. The directed edge extends from the second node to the first node indicating that execution of the second maneuver by the autonomous vehicle is dependent upon execution of the first maneuver by the vehicle. At 810, the autonomous vehicle generates a subgraph for the awareness graph by selecting a subset of nodes in the nodes and a subset of directed edges in the directed edges. The subgraph includes the first node, the second node, and the directed edge.

At 812, the autonomous vehicle determines an ordering in which the first maneuver and the second maneuver are to occur based upon the subgraph. At 814, the autonomous vehicle controls an engine of the autonomous vehicle such that the autonomous vehicle executes the second maneuver in accordance with the ordering. For instance, the autonomous vehicle may execute the second maneuver prior to the vehicle executing the first maneuver, or the autonomous vehicle may yield to the vehicle until the vehicle executes the first maneuver. The methodology 800 concludes at 816.

Turning now to FIG. 9, an exemplary methodology 900 for determining an ordering in which an autonomous vehicle is to execute a maneuver relative to maneuvers executed by other vehicles is illustrated. The methodology 900 begins at 902, and at 904, the autonomous vehicle calculates a first score for a first candidate ordering. The first candidate ordering is determined based upon a subgraph of an awareness graph (described above). At 906, the autonomous vehicle calculates a second score for a second candidate ordering. The second candidate ordering is determined based upon the subgraph of the awareness graph. The first score and the second score are based upon metadata for the maneuvers in the subgraph of the awareness graph.

At 908, the autonomous vehicle determines whether the first score is less than, equal to, or greater than the second score. At 910, when the first score is less than the second score, the autonomous vehicle uses the second candidate ordering as the ordering. At 912, when the first score is greater than or equal to the second score, the autonomous vehicle uses the first candidate ordering as the ordering. The methodology 900 concludes at 914.

Figure 10:
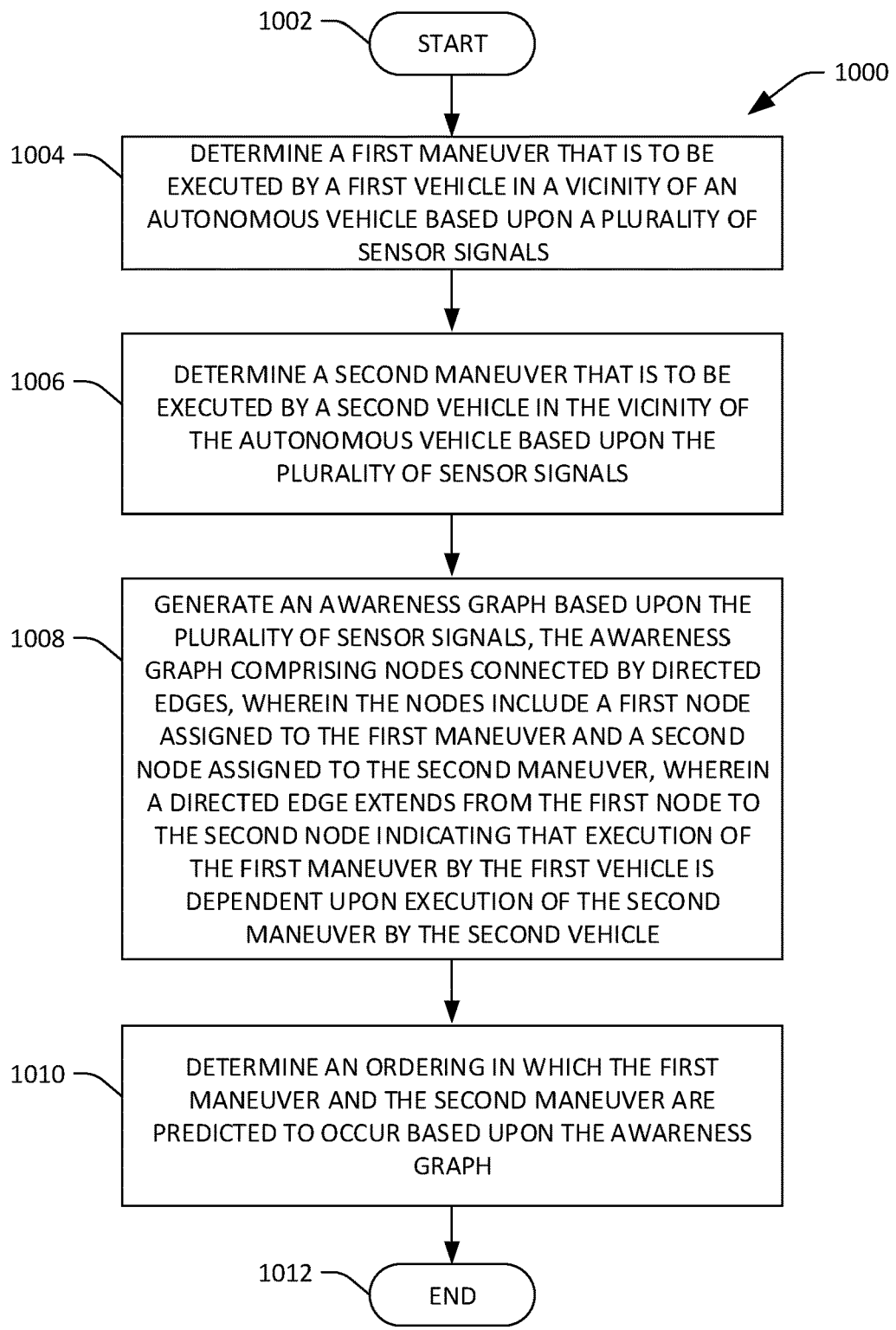
FIG. 10 is a flow diagram illustrating an exemplary methodology for generating an awareness graph based upon sensor signals.

Turning now to FIG. 10, an exemplary methodology for generating an awareness graph based upon sensor signals generated by sensor systems of an autonomous vehicle is illustrated. The methodology 1000 begins at 1002, and at 1004, the autonomous vehicle determines a first maneuver that is to be executed by a first vehicle in a vicinity of the autonomous vehicle based upon a plurality of sensor signals generated by a plurality of sensor systems of the autonomous vehicle. At 1006, the autonomous vehicle determines a second maneuver that is to be executed by a second vehicle in the vicinity of the autonomous vehicle based upon the plurality of sensor signals. At 1008, the autonomous vehicle generates an awareness graph based upon the plurality of sensor signals, the awareness graph comprising nodes connected by directed edges. The nodes include a first node assigned to the first maneuver and a second node assigned to the second maneuver. A directed edge extends from the first node to the second node indicating that execution of the first maneuver by the first vehicle is dependent upon execution of the second maneuver by the second vehicle. At 1010, the autonomous vehicle determines an ordering in which the first maneuver and the second maneuver are predicted to occur based upon the awareness graph. The methodology 1000 concludes at 1012.

Figure 11:
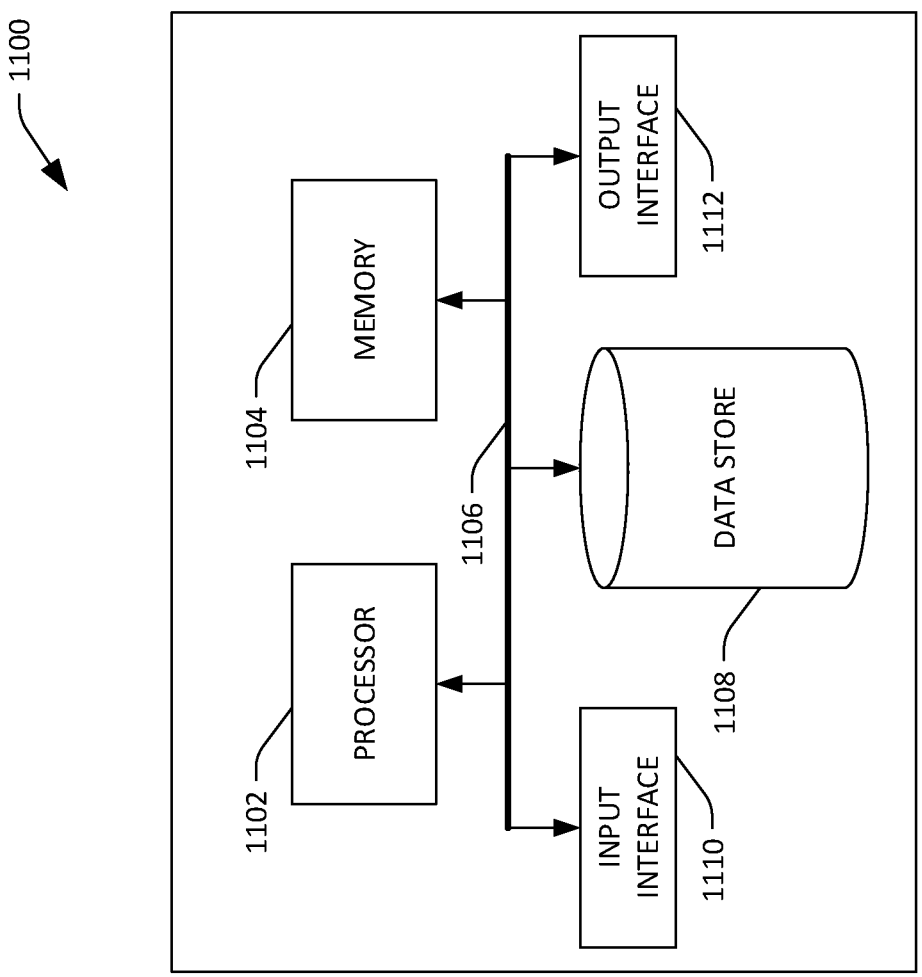
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be or include the computing system 112. The computing device 1100 includes at least one processor 1102 that executes instructions that are stored in a memory 1104. The instructions may be, for instance, instructions for implementing functionality described as being carried out by one or more modules and systems discussed above or instructions for implementing one or more of the methods described above. The processor 1102 may be a GPU, a plurality of GPUs, a CPU, a plurality of CPUs, a multi-core processor, etc. The processor 1102 may access the memory 1104 by way of a system bus 1106. In addition to storing executable instructions, the memory 1104 may also store maneuver data, awareness graphs, subgraphs of awareness graphs, computer-implemented machine learning models, etc.

The computing device 1100 additionally includes a data store 1108 that is accessible by the processor 1102 by way of the system bus 1106. The data store 1108 may include executable instructions, maneuver data, awareness graphs, subgraphs of awareness graphs, computer-implemented machine learning models, etc. The computing device 1100 also includes an input interface 1110 that allows external devices to communicate with the computing device 1100. For instance, the input interface 1110 may be used to receive instructions from an external computer device, etc. The computing device 1100 also includes an output interface 1112 that interfaces the computing device 1100 with one or more external devices. For example, the computing device 1100 may transmit control signals to the engine 106, the braking system 108, and/or the steering system 110 by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the above-described technologies have been described with reference to a jurisdiction obeying a right-hand traffic (RHT) convention, it is to be appreciated that the above-described technologies may also be employed in a jurisdiction obeying a left-hand traffic (LHT) convention.

What is claimed is:

1. An autonomous vehicle comprising:
a plurality of sensor systems that generate a plurality of sensor signals, the plurality of sensor signals indicative of a first vehicle and a second vehicle in a vicinity of the autonomous vehicle; and
a computing system that is in communication with the plurality of sensor systems, the computing system comprising:
a processor; and
memory storing instructions that, when executed by the processor, cause the processor to perform acts comprising:
generating an awareness graph based upon the plurality of sensor signals, the awareness graph comprising nodes connected by directed edges, wherein the nodes include a first node assigned to a first maneuver that is to be executed by the first vehicle, a second node assigned to a second maneuver that is to be executed by the first vehicle, a third node that is assigned to a third maneuver that is to be executed by the second vehicle, and a fourth node assigned to a fourth maneuver that is to be executed by the autonomous vehicle, wherein a predicted path of the first vehicle comprises at least the first maneuver and the second maneuver, wherein a first directed edge extends from the first node to the second node indicating a dependency between execution of the second maneuver by the first vehicle and execution of the first maneuver by the first vehicle, wherein a second directed edge extends from the third node to the second node indicating a dependency between execution of the second maneuver by the first vehicle and execution of the third maneuver by the second vehicle, and further wherein a third directed edge extends from the fourth node to the second node indicating a dependency between execution of the second maneuver by the first vehicle and execution of the fourth maneuver by the autonomous vehicle;

generating a subgraph of the awareness graph by selecting a subset of nodes in the nodes and a subset of directed edges in the directed edges, wherein the subset of directed edges connect the subset of nodes, wherein the subgraph includes the second node, the fourth node, and the third directed edge, and wherein the subgraph lacks the first node, the third node, the first directed edge, and the second directed edge;

determining an ordering in which the second maneuver to be executed by the first vehicle and the fourth maneuver to be executed by the autonomous vehicle are to occur based upon the subgraph;

when the ordering indicates that the autonomous vehicle is to execute the fourth maneuver before the first vehicle executes the second maneuver, causing the autonomous vehicle to execute the fourth maneuver; and when the ordering indicates that the autonomous vehicle is to execute the fourth maneuver subsequent to the first vehicle executing the second maneuver, causing the autonomous vehicle to yield to the first vehicle.

2. The autonomous vehicle of claim 1, wherein the fourth node is added to the awareness graph after the first node, the second node, and the third node are added to the awareness graph.

3. The autonomous vehicle of claim 1, the acts further comprising:

prior to generating the awareness graph:

determining the first maneuver of the first vehicle, a first position of the first vehicle relative to the autonomous vehicle, and first regions of interest surrounding the first vehicle based upon the plurality of sensor signals, wherein the first regions of interest are to be monitored for operation of the first vehicle during the first maneuver; and determining the second maneuver of the first vehicle, a second position of the first vehicle relative to the autonomous vehicle, and second regions of interest surrounding the first vehicle based upon the plurality of sensor signals, wherein the second regions of interest are to be monitored for operation of the first vehicle during the second maneuver; and determining the fourth maneuver of the autonomous vehicle and third regions of interest surrounding the autonomous vehicle that are to be monitored by the autonomous vehicle during the fourth maneuver.

4. The autonomous vehicle of claim 3, wherein the third directed edge is added to the awareness graph when the second position of the first vehicle is within the third regions of interest surrounding the autonomous vehicle.

5. The autonomous vehicle of claim 3, wherein the first regions of interest, the second regions of interest, and the third regions of interest are determined based upon output of a computer-implemented machine learning model.

6. The autonomous vehicle of claim 1, wherein the first maneuver is one of a first left turn, a first right turn, a first U-turn, or maintaining a first straight heading, wherein the second maneuver is one of a second left turn, a second right turn, a second U-turn, or maintaining a second straight heading, wherein the third maneuver is one of a third left turn, a third right turn, a third U-turn, or maintaining a third straight heading, and wherein the fourth maneuver is one of a fourth left turn, a fourth right turn, a fourth U-turn, or maintaining a fourth straight heading.

7. The autonomous vehicle of claim 1, wherein the autonomous vehicle further comprises an engine, a braking system, and a steering system, wherein causing the autonomous vehicle to execute the fourth maneuver comprises controlling at least one of the engine, the braking system, or the steering system to execute the fourth maneuver, wherein causing the autonomous vehicle to yield to the first vehicle comprises controlling at least one of the engine, the braking system, or the steering system to yield to the first vehicle.

8. The autonomous vehicle of claim 1, wherein the plurality of sensor systems includes at least one of a radar sensor system, a lidar sensor system, or a camera sensor system.

9. The autonomous vehicle of claim 1, wherein the directed edges in the awareness graph are weighted, wherein a weight of the third directed edge is indicative of a proximity of the first vehicle to the autonomous vehicle, and further wherein determining the ordering in which the second maneuver and the fourth maneuver are to occur is further based upon the weight of the third directed edge.

10. The autonomous vehicle of claim 1, wherein the computing system generates new awareness graphs at a fixed time interval.

11. The autonomous vehicle of claim 1, wherein determining the ordering comprises:

determining a first candidate ordering based upon the subgraph;

calculating a first score for the first candidate ordering based upon metadata for maneuvers in the subgraph;

determining a second candidate ordering based upon the subgraph;

calculating a second score for the second candidate ordering based upon the metadata for the maneuvers in the subgraph;

when the first score is greater than or equal to the second score, using the first candidate ordering as the ordering; and when the first score is less than the second score, using the second candidate ordering as the ordering.

12. A method performed by an autonomous vehicle comprising an engine and a plurality of sensor systems that generate a plurality of sensor signals, the plurality of sensor signals indicative of a first vehicle and a second vehicle in a vicinity of the autonomous vehicle, the method comprising:

determining a first maneuver and a second maneuver that are to be executed by the first vehicle based upon the plurality of sensor signals, wherein a predicted path of the first vehicle comprises at least the first maneuver and the second maneuver;

determining a third maneuver that is to be executed by the second vehicle based upon the plurality of sensor signals;

generating an awareness graph based upon the plurality of sensor signals, the awareness graph comprising nodes connected by directed edges, wherein the nodes include a first node assigned to the first maneuver that is to be executed by the first vehicle, a second node assigned to the second maneuver that is to be executed by the first vehicle, a third node assigned to the third maneuver that is to be executed by the second vehicle, a first directed edge that extends from the first node to the second node, and a second directed edge that extends from the third node to the second node, wherein the first directed edge indicates a dependency between execution of the second maneuver by the first vehicle and execution of the first maneuver of the first vehicle, and wherein the second directed edge indicates a dependency between execution of the second maneuver by the first vehicle and execution of the third maneuver by the second vehicle;

responsive to determining a fourth maneuver that is to be executed by the autonomous vehicle, adding a fourth node and a third directed edge to the awareness graph, wherein the fourth node is assigned to the fourth maneuver that is to be executed by the autonomous vehicle, wherein the third directed edge extends from the fourth node to the second node indicating a dependency between execution of the fourth maneuver by the autonomous vehicle and execution of the second maneuver by the first vehicle;

generating a subgraph of the awareness graph by selecting a subset of nodes in the nodes and a subset of directed edges in the directed edges, wherein the subset of directed edges connect the subset of nodes, wherein the subgraph includes the second node, the fourth node, and the third directed edge, and wherein the subgraph lacks the first node, the third node, the first directed edge, and the second directed edge;

determining an ordering in which the second maneuver and the fourth maneuver are to occur based upon the subgraph; and controlling the engine such that the autonomous vehicle executes the fourth maneuver in accordance with the ordering.

13. The method of claim 12, wherein the first maneuver is one of a first left turn, a first right turn, a first U-turn, or maintaining a first straight heading, wherein the second maneuver is one of a second left turn, a second right turn, a second U-turn, or maintaining a second straight heading, wherein the third maneuver is one of a third left turn, a third right turn, a third U-turn, or maintaining a third straight heading, and wherein the fourth maneuver is one of a fourth left turn, a fourth right turn, a fourth U-turn, or maintaining a fourth straight heading.

14. The method of claim 12, wherein the plurality of sensor systems includes at least one of a radar sensor system, a lidar sensor system, or a camera sensor system.

15. The method of claim 12, wherein the subgraph includes a second subset of nodes and a second subset of directed edges that form a cycle within the subgraph, the method further comprising:

prior to determining the ordering, resolving the cycle within the subgraph by condensing the second subset of nodes and the second subset of directed edges into a condensed node.

16. The method of claim 12, further comprising:

prior to determining the ordering and subsequent to adding the fourth node and the third directed edge to the awareness graph, determining a first score for the awareness graph based upon metadata for maneuvers in the awareness graph, wherein the first score is reflective a first state of the vicinity surrounding the autonomous vehicle when the autonomous vehicle executes the fourth maneuver;

determining a fifth maneuver for the autonomous vehicle, wherein the fifth maneuver is an alternative to the fourth maneuver;

removing the fourth node and the third directed edge from the awareness graph;

adding a fifth node and at least one additional directed edge to the awareness graph, wherein the fifth node is assigned to the fifth maneuver, wherein the at least one additional directed edge connects the fifth node to at least one node in the nodes;

determining a second score for a second awareness graph based upon metadata for maneuvers in the second awareness graph, wherein the second score is reflective of a second state of the vicinity surrounding the autonomous vehicle when the autonomous vehicle executes the fifth maneuver, wherein the first score is greater than the second score; and responsive to determining that the first score is greater than the second score, causing the fourth node and the third directed edge to be added to the awareness graph.

17. The method of claim 12 further comprising:

prior to generating the awareness graph, determining, based upon the plurality of sensor signals, at least one of a speed of the first vehicle, an acceleration of the first vehicle, a set of lanes that are to be traversed by the first vehicle during the first maneuver, a predicted path of the first vehicle, a position of the first vehicle relative to the autonomous vehicle, first regions of interest surrounding the first vehicle that are to be monitored by an operator of the first vehicle during the first maneuver, or second regions of interest surrounding the first vehicle that are to be monitored by the operator of the first vehicle during the second maneuver; and determining third regions of interest surrounding the autonomous vehicle that are to be monitored by the autonomous vehicle during the fourth maneuver.

18. The method of claim 17, wherein the third directed edge is added to the awareness graph when the position of the first vehicle is within the third regions of interest surrounding the autonomous vehicle.

19. The method of claim 12, wherein the directed edges in the awareness graph are weighted, wherein a weight of the third directed edge is indicative of a proximity of the first vehicle to the autonomous vehicle, and further wherein determining the ordering in which the second maneuver and the fourth maneuver are to occur is further based upon the weight of the third directed edge.

20. An autonomous vehicle comprising:

a plurality of sensor systems that generate a plurality of sensor signals, the plurality of sensor signals indicative of a first vehicle and a second vehicle in a vicinity of the autonomous vehicle;

one or more processing units; and a computer-readable storage medium comprising instructions that, when executed by the one or more processing units, cause the one or more processing units to perform acts comprising:

determining a first maneuver and a second maneuver that are to be executed by the first vehicle based upon the plurality of sensor signals;

determining a third maneuver that is to be executed by the second vehicle based upon the plurality of sensor signals;

generating an awareness graph based upon the plurality of sensor signals, the awareness graph comprising nodes connected by directed edges, wherein the nodes include a first node assigned to the first maneuver, a second node assigned to the second maneuver, and a third node assigned to the third maneuver, wherein a first directed edge extends from the first node to the second node indicating a dependency between execution of the first maneuver by the first vehicle and execution of the second maneuver by the first vehicle, and wherein a second directed edge extends from third node to the second node indicating a dependency between execution of the third maneuver by the second vehicle and execution of the second maneuver by the first vehicle; and responsive to determining a fourth maneuver that is to be executed by the autonomous vehicle, adding a fourth node and a third directed edge to the awareness graph, wherein the fourth node is assigned to the fourth maneuver, and wherein the third directed edge extends from the fourth node to the first node;

generating a subgraph of the awareness graph by selecting a subset of the nodes and a subset of the directed edges, wherein the subset of the directed edges connect the subset of the nodes, wherein the subgraph includes the first node, the fourth node, and the third directed edge, and wherein the subgraph lacks at least the second node, the third node, the first directed edge, and the second directed edge; and determining an ordering in which the first maneuver and the fourth maneuver are predicted to occur based upon the subgraph.

\* \* \* \* \*